United States Patent [19]
Klug et al.

[11] Patent Number: 6,105,437
[45] Date of Patent: Aug. 22, 2000

[54] PRESSURE TRANSDUCER

[75] Inventors: Arno Klug, Elsenfeld; Joachim Ciba, Bürgstadt, both of Germany

[73] Assignee: Wika Alexander Wiegand GmbH & Co., Germany

[21] Appl. No.: 09/167,778

[22] Filed: Oct. 7, 1998

[30] Foreign Application Priority Data

Oct. 10, 1997 [EP] European Pat. Off. .............. 97117602

[51] Int. Cl.[7] ....................................................... G01L 7/00
[52] U.S. Cl. ............................................................. 73/756
[58] Field of Search ...................................... 73/706, 756

[56] References Cited

U.S. PATENT DOCUMENTS 4,939,497  7/1990  Nishida et al. .

FOREIGN PATENT DOCUMENTS

| 0284633 | 10/1988 | European Pat. Off. ......... G01L 19/06 |
| 0397392 | 11/1990 | European Pat. Off. ......... G01L 19/14 |
| 0651240 | 5/1995 | European Pat. Off. ......... G01L 19/14 |
| 0660482 | 6/1995 | European Pat. Off. ......... H02G 15/04 |
| 3114034 | 6/1991 | Japan . |
| 4204132 | 7/1992 | Japan . |
| 573968 | 10/1993 | Japan . |
| 7500920 | 1/1995 | Japan . |
| 7151625 | 6/1995 | Japan . |
| 734340 | 6/1995 | Japan . |
| 8292118 | 5/1996 | Japan . |

OTHER PUBLICATIONS

European Search Report with Listing of Art RE Application 97117602.9—Mar. 4, 1998.

*Primary Examiner*—William Oen
*Attorney, Agent, or Firm*—Richard A. Speer; Mayer Brown & Platt

[57] ABSTRACT

The pressure transducer comprises a pressure connection (2) and a tube-shaped housing (22) that is securely attached at its lower end section (24) to the pressure connection. Arranged in the interior of the housing (22) are a pressure sensor (6) carried by the pressure connection (2) and a circuit arrangement (8). An interface module (18) is attached at the upper end section (26) of the housing (22), the connection between the interface module (18) and the upper end section (26) being effected by means of a locking ring (32) that is locked to the housing (22) and that is either integral with the interface module (18) or that carries a union nut (46) that secures the interface module (18) to the locking ring (32). During manufacture of the pressure transformer, the housing (22) is attached to the pressure connection (2) before the interface module (18) is brought into electrical contact with the circuit arrangement (8) and before it is connected mechanically to the housing (22). This makes it possible to adjust the pressure transducer prior to attaching the interface module (18). Furthermore, the pressure transducer can be provided with a plurality of different interface modules without this resulting in disadvantages during manufacture of the pressure transducer. (FIG. 1)

13 Claims, 4 Drawing Sheets

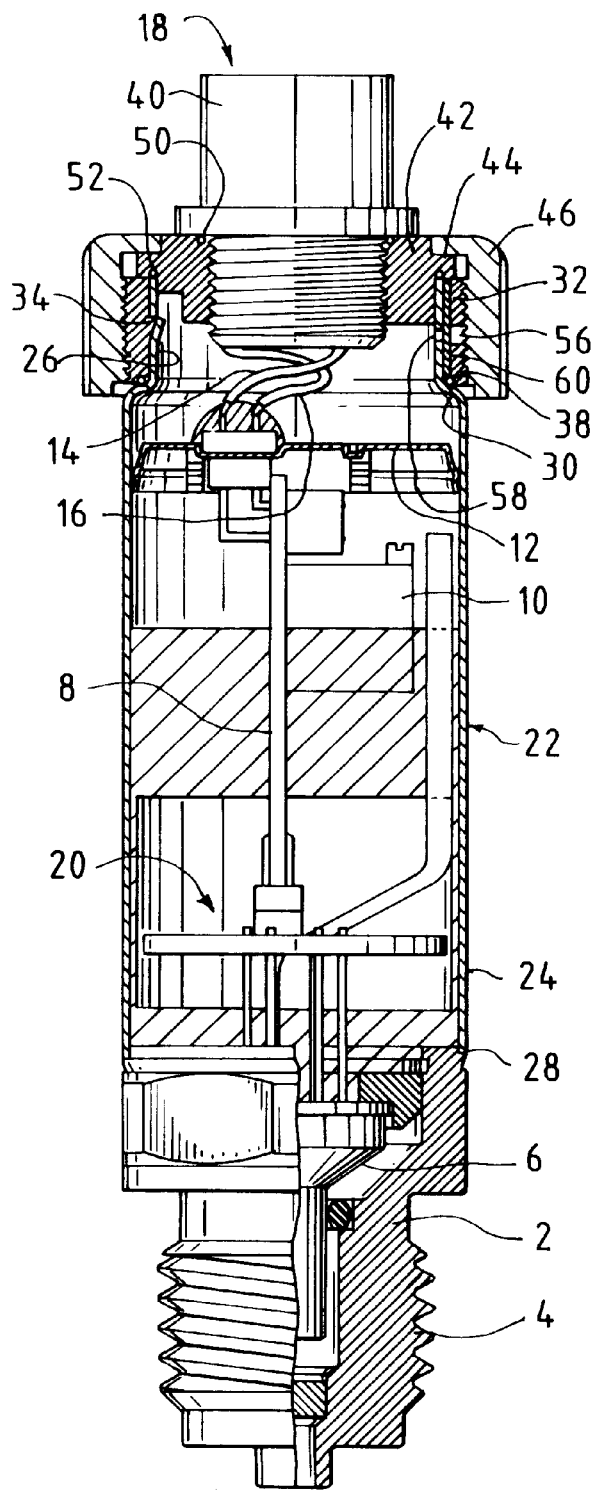

PRESSURE TRANSDUCER

FIELD OF THE INVENTION

This invention relates to pressure tranducers and especially to the manufacture and constrution of transdusers having mounting, or connecting apparatus that permits adaptation of the transducers to different applications.

BACKGROUND OF THE INVENTION

The invention is a method for manufacturing a pressure transducer in accordance with the preamble to claim 1 and the invention is furthermore a pressure transducer in accordance with the preamble to claim 7.

A pressure transducer comprising the features of the preamble to claim 6 is known. The known pressure transducer provides to downstream display, control, or regulating devices an electrical output signal in the form of an output signal voltage or output signal current that is a measure of the pressure measured. For this purpose the pressure transducer comprises a pressure sensor that can constitute, e.g., a piezo-sensor that uses the piezo-resistive effect or a thin-film pressure sensor having thin-film measurement strips. The pressure sensor is supplied using electrical auxiliary energy in that an electrical voltage is applied to it and it is subjected directly or indirectly to the pressure of a measured medium. The electrical output signal from the pressure sensor changes depending on the effective pressure, the signal being forwarded to a circuit arrangement that, e.g., comprises a bridge circuit and/or adjustable resistances for null measurement, temperature compensation and setting nominal sensitivity. The circuit arrangement is electrically connected to an interface module that generally comprises an apparatus plug into which a signal cable can be plugged for forwarding the output signal from the pressure transducer. However, the interface module can also be a cable. The known pressure transducer comprises a pressure connection, generally a component provided with an external thread, by means of which the pressure transducer can be connected—directly or by means of an adapter—to the system with the measured medium. The pressure connection is also the carrier for the pressure sensor, which is attached at the pressure connection. A tube-shaped housing, made of metal (as is the pressure connection) comprises a first and a second end section. The first end section is welded securely to the pressure connection. The circuit arrangement and any pressure sensor elements projecting from the pressure connection are arranged protected in the interior of the housing.

In the known pressure transducer, a threaded ring, made of metal and having external threads, is welded to the second end section of the housing, the section facing away from the pressure connection. Inserted into the threaded ring is the interface module and a sealing ring. A union nut, screwed onto the threaded ring and engaged with the interface module, securely attaches the interface module to the threaded ring and therefore to the housing. In order to be able to measure relative pressures, the known pressure transducer generally comprises a ventilation apparatus, which is formed in the interface module and/or in the threaded ring. Alternatively, if the interface module is a cable, ventilation can also be performed by means of an internally ventilated signal cable.

Also known is a pressure transducer that is very similar to the pressure transducer described in the foregoing, but that differs from it in that the interface module is not connected to the housing via a threaded ring welded to the housing and via a union nut, but rather is connected to the housing directly by means of flanging and pressing the second end section of the housing.

In the course of manufacturing the known pressure transducer as described in the foregoing, the pressure connection, pressure sensor, and circuit arrangement are connected mechanically and electrically to form a sub-system. The threaded ring is welded to the housing. Then the interface module is inserted into the threaded ring and secured to it by means of the union nut. It is not until this point that the interface module is placed in electrical contact with the circuit arrangement and the housing is placed on the pressure connection of the sub-system and contact welded to it along the circumference of the first end section of the housing. The pressure transducer assembled in this manner then undergoes functional testing and is adjusted. This includes subjecting it to various temperatures so that it can be determined whether the desired display accuracy has been achieved for the ranges of permissible ambient temperature and whether the measured medium is at the permissible temperature so that any required adjustments can be made.

Since in the known procedure functional testing and adjustments must be performed on the fully-assembled pressure transducer, access to the interior of the transducer is necessarily difficult and making adjustments is a relatively complicated procedure.

Numerous different types and sorts of apparatus plugs are known and in use. This has led to a situation in which various versions of a particular type of pressure transducer are produced, and these differ from each other in terms of interface module (namely, the type of apparatus plug) and in terms of housing shape adapted to the interface module, but they are otherwise identical. To the pressure transducer manufacturer this means that the manufacturer must maintain in storage various versions of the same type of pressure transducer if the manufacturer wants to be able to fill short-notice orders from customers. In particular, the costs of the complex storage required for this can be reduced in that the manufacturer does not perform final assembly i.e., assembly of the sub-system comprising pressure connection, pressure sensor, and circuit arrangement with the housing and interface module until after a customer has placed an order. However, this increases delivery time by the time required for this final assembly and for the functional testing and adjustments that cannot be performed until after the housing has been attached to the pressure connection.

The object of the invention is to develop the method in accordance with the preamble to claim 1 such that the disadvantages described in the foregoing are avoided. This includes making it easier to make adjustments and perform functional testing. Another aspect that is an improvement is that a plurality of different interface modules will be selectable for one and the same type of pressure transducer without this resulting in expensive storage arrangements or lengthy delivery times.

Furthermore, the object of the invention is to develop the pressure transducer in accordance with the preamble to claim 6 such that its manufacture is simplified. In particular, the pressure transducer created should be suitable for manufacture in accordance with the invented method.

The object stated is achieved in terms of method by the method in accordance with claim 1. Provided in accordance with the invented method, the housing is attached at the pressure connection of the sub-system prior to the interface module being electrically connected to the circuit arrangement and mechanically connected to the housing. While for the conventional method the interior of the pressure transducer is difficult to access after connecting the housing to the sub-system due to the interface module being connected to the housing beforehand, in the case of the invention, after the housing is attached to the pressure connection, the housing is still open at its second end section so that the interior of the pressure transducer is easier to access and is thus easier to adjust.

The ability provided by the invention to perform functional testing and adjustments prior to the interface module being mechanically connected to the housing and placed in electrical contact with the circuit arrangement furthermore has the advantage that no additional adjustments or functional testing are necessary after the interface module is connected to the housing. If a certain type of pressure transducer is optionally to be provided with a plurality of different interface modules, this can be done such that only the different selectable interface modules are maintained in storage and such that final assembly, i.e., assembling the interface module with the housing, is not done until a customer has placed an order. Delivery time is still short because functional testing and adjustments have already been performed prior to this assembly. In addition, the expenses associated with storage are reduced because only various interface modules (and not pre-manufactured sub-systems made of housing and interface module) are pre-manufactured and stored when, as is advantageously provided, the housing is designed such that it can be connected to each of the different interface modules.

With regard to the pressure transducer, the object upon which it is based is achieved by the pressure transducer in accordance with claim 7. In this claim it is inventively provided that the connection between the interface module and the second end section comprises a locking apparatus.

In this context a locking apparatus is a connecting apparatus in which the two parts connected to each other move relative to each other while connected until a projection in one of the two parts locks into a seat in the other of the two parts. Such a locking apparatus can be realized by means of a so-called "snap" apparatus in which the projection in elastically deformed during the joining process until it can expand into the seat and thereby lock in it. However, the locking apparatus can also be realized by means of a bayonet coupling apparatus in which a bayonet base engages at the end of an angled bayonet slot or an angled groove and is held in this position by an elastic force.

Because of the inventive design, conventional welding of a threaded ring to the second end section of the housing is no longer necessary in the pressure transducer in accordance with the invention. This simplifies manufacture of the pressure transducer in accordance with the invention.

In an advantageous design of the invention it can be provided that the second end section of the housing is cylindrical in shape, that a locking ring engages the cylindrical end section, that the locking apparatus comprises at least one projection, which is located either on the locking ring or on the cylindrical end section, and furthermore comprises at least one seat, which is located on the other of these two parts (cylindrical end section or locking ring) and into which the projection locks, and that the interface module is connected to the locking ring. In this design, manufacture of the locking apparatus requires only a translational movement of the locking ring relative to the housing in the direction of the axis of the end section. This movement can be caused to occur using simple tools or even manually. Furthermore, affixing the locking ring does not require heat, as welding would.

If the locking ring comprises a plastic, as is advantageously provided, manufacture of the locking ring itself is simplified in comparison to manufacture of the metal threaded ring in the conventional pressure transducer.

In an advantageous design of the invention, furthermore, it can be provided that the locking ring is positioned on the external side of the cylindrical end section, that the locking ring is provided with external threads on its external side, that the interface module comprises an annular flange, and that a union nut is threaded onto the external threads of the locking ring and holds the annular flange in place on the locking ring. Essentially the same parts can be used in this design as in the conventional pressure transducer; however, the deciding advantage is that the welded connection has been replaced with the locking apparatus using the locking ring.

As an alternative to the preceding design, in an advantageous design of the invention it can be provided that the locking ring and interface module are connected to form a sub-system so that then the union nut is not required and the entire approach to the mechanical connection between the interface module and the end section of the housing is reduced to locking on the sub-system that comprises the interface module and locking ring.

Furthermore, in an advantageous design it can be provided that there is a recess on the side of the locking ring facing the cylindrical end section and/or on the side of the cylindrical end section facing the locking ring, that in the region of the recess both the cylindrical end section and the locking ring are provided an opening, and that arranged in the recess is a membrane made of a material that is liquid-impermeable and gas-permeable. This creates a simple and reliable ventilation apparatus.

Further designs of the invention are characterized in subordinate claims.

Exemplary embodiments of the invention are illustrated in the drawings and explained in greater detail in the following.

BRIEF DESCRIPTION OF THE DRAWINGS

FIG. 1 shows a longitudinal section through a first embodiment of a pressure transducer in accordance with the invention:

FIG. 2 shows a perspective of a locking ring for the pressure transducer in accordance with FIG. 1;

DETAILED DESCRIPTION OF THE DRAWINGS

Figure 3:
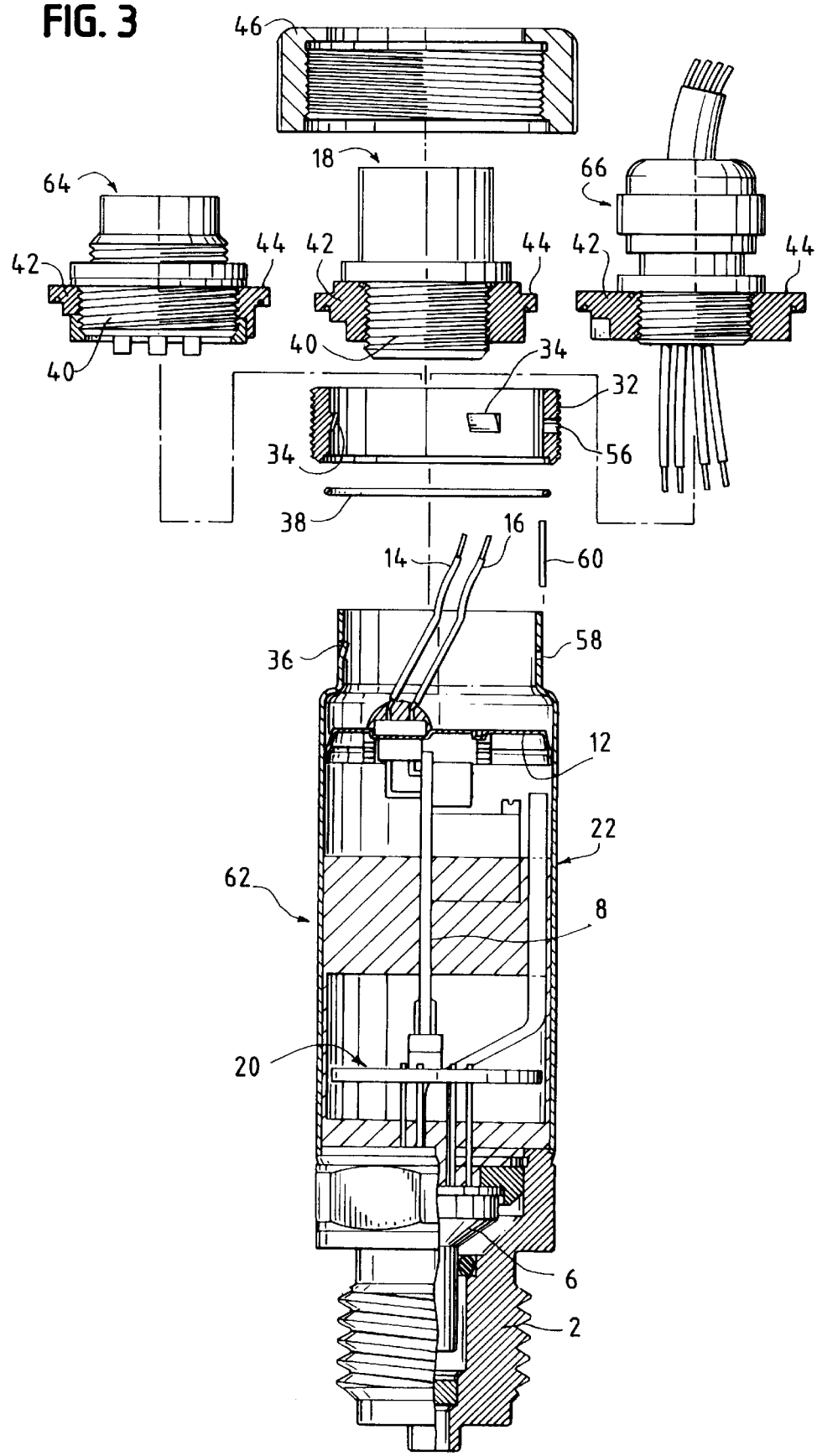
FIG. 3 shows elements of the pressure transducer in accordance with FIG. 1, and the elements can be connected to each other during manufacture of said transducer.

The pressure transducer illustrated in FIG. 1 comprises a pressure connection 2 that is made of, e.g., CrNi steel and that is provided with an external thread 4 by means of which it can be screwed into a threaded hole of a system containing a measured medium such that the pressure of the measured medium acts upon the interior of the pressure connection 2. The pressure connection 2 contains a pressure sensor 6 that is positioned and affixed inside the pressure connection 2 such that the pressure of the measured medium can directly or indirectly act upon the sensor element of the pressure sensor 6. The pressure sensor 6 is designed as a piezo-sensor in the exemplary embodiment illustrated.

Arranged above the pressure sensor 6 in FIG. 1 is a circuit arrangement 8 that is electrically connected to the pressure sensor 6 and that carries, among other things, an adjustable resistance 10 for the purpose of making adjustments. Located above the circuit arrangement 8 is a separating wall 12 that is provided with an opening (not shown) through which the resistance 10 can be reached. Leading upward from the separating wall 12 are lines 14 and 16 that electrically connect the circuit arrangement 8 to an interface module 18 and via which, firstly, electrical auxiliary energy is supplied to the circuit arrangement 8 and, secondly, the electrical output signal of the pressure transducer is forwarded.

The pressure connection 2, pressure sensor 6, circuit arrangement 8, and separating wall 2 of the illustrated exemplary embodiment of the pressure transducer constitute a sub-system 20 and are conventional. They are not explained in greater detail here.

The pressure transducer illustrated furthermore encompasses a tube-shaped metallic housing 22 that comprises, e.g., CrNi steel. This housing 22 has an essentially circular cylindrical cross-section and comprises a first end section 24, toward the bottom in FIG. 1, and a second end section 26 (toward the top in FIG. 1). The housing 22 is connected at its lower end section 24 by means of an encircling weld 28 to the pressure connection 2. Arranged protected in the interior of the housing above the pressure connection are elements of the pressure sensor 6, the circuit arrangement 8, and the separating wall 12.

The upper end section 26 is cylindrical in shape and has a circular cylindrical cross-section. It has a smaller diameter than the rest of the housing 22 and comprises at its lower end a shoulder 30 that constitutes the transition between the cylindrical end section 26 and the rest of the housing.

Engaged with the cylindrical end section 26 is a locking ring 32, which is shown in perspective in FIG. 2. This locking ring is made of plastic and extends in a direction relative to the housing 22 over essentially the same length as the cylindrical end section 26. The locking ring 32 encloses the external side of the cylindrical end section 26 and comprises on its interior side three wedge-shaped projections 34 that are distributed evenly around the circumference and that engage seats 36 in the cylindrical end section 26, these having shapes complementary to the projections 34. Each seat 36 can be designed as an opening in the cylindrical end section 26 or can be formed in that a tongue-shaped section of the end section 26 is bent inward radially, as shown at the top left of FIG. 1. The projections 34 and seats 36 together constitute a locking apparatus. A sealing ring 38 is positioned between the shoulder 30 and locking ring 32.

The locking ring 32 is connected to the cylindrical end section 26 in that it is pushed onto the cylindrical end section from above (in FIG. 1). This causes the wedge-shaped projections 34 to slide on the end section 26 so that they are elastically deformed until they enter the seats 36 and lock into them. This type of locking connection is a snap connection. The locking ring 32 is therefore designed as a snap ring in the exemplary embodiment illustrated.

The interface module 18 comprises an apparatus plug 40 and an adapter ring 42, upon which is formed an annular flange 44. The apparatus plug 40 and the adapter ring 42 are securely connected to each other in any desired manner, e.g., they are screwed or glued together. The adapter ring 42 of the interface module 18 is inserted into the cylindrical end section 26 of the housing 22 such that the annular flange 44 sits on the upper edge of the end section 26 and the upper end of the locking ring 32. The interface module 18 is held securely in this position by a union nut 46 that is screwed onto the locking ring 32, which has an external thread 48 on its external side. Arranged between the apparatus plug 40 and the adapter ring 42 is a sealing ring 50, and arranged between the annular flange 44 and the upper edge of the cylindrical end section 26 is a sealing ring 52. The lines 14 and 16 are in electrical contact with the apparatus plug 40 by means of, e.g., soldering.

The locking ring 32 comprises on its interior a recess 54 (see FIG. 2). The locking ring 32 is provided an opening 56 in the region of this recess 54. The cylindrical end section 26 also comprises an opening 58 in the region of the recess 54.

A membrane 60 that is made of a liquid-impermeable and gas-permeable material and the contour of which has been adapted to the recess 54 is positioned in the recess 54 and is thereby enclosed between the interior of the locking ring 32 and the exterior of the cylindrical end section 26. This constitutes a ventilation apparatus. Gas can be exchanged between the interior of the pressure transducer and the surrounding atmosphere through the opening 58, the membrane 60, the opening 56, and between the turns in the external thread 48 and the internal thread of the union nut 46 so that the ambient pressure prevails in the interior of the pressure transducer. However, the membrane 60 prevents liquid from penetrating in to the interior or the pressure transducer.

Manufacture of the pressure transducer described in the foregoing using FIGS. 1 and 2 is explained in the following using FIG. 3.

First, the sub-system 20 is manufactured from the pressure connection 2, pressure sensor 6, circuit arrangement 8, and separating wall 12. In addition, the housing 22 is produced, this being a single-piece component of relatively simple design, so that it can be produced relatively simply and especially so that it does not require that a plurality of components be joined, e.g., by means of welding. The housing 22 is pushed onto the sub-system 20 and then connected securely at its lower end section 24 to the pressure connection 2 by means of a weld 28. This produces the transducer unit 62, shown at the bottom of FIG. 3, which is already fully functional. As demonstrated in the following description, further construction of the transducer unit to create the finished pressure transducer (with the exception of the electrical contacts for lines 14 and 16) merely requires one screwing-in procedure and one locking procedure and in particular does not require any processing involving heat or plastic deformation of parts. Therefore the transducer unit 62 as such can be and is subjected to functional testing and adjusted prior to the pressure transducer undergoing final assembly. It is simple to perform the adjustments since the housing 22 at this point is still open above.

The locking ring 32 is then pushed onto the cylindrical end section 26 of the tested and adjusted transducer unit 62 until the projections 34 have locked in the seats 36. This means that the sealing ring 38 is inserted between the locking ring 32 and the shoulder 30 and the membrane 60 is seated in the recess 54. Then the interface module 18 is placed in contact with the lines 14 and 16 by means of soldering, whereupon the interface module 18 is pushed into the cylindrical end section 26 and is secured in this position by screwing the union nut 26 on. This concludes manufacture of the pressure transducer, including functional testing and adjusting.

Since the connection between the interface module 18 and the cylindrical end section 26 of the housing comprises the locking apparatus, which in the exemplary embodiment described comprises the projections 34 of the locking ring 32 made of plastic and the seats 36, manufacture of the described pressure transducer is simplified. In addition, the described pressure transducer is characterized by the described ventilation apparatus, which is simple to manufacture and is particularly useful.

If different versions of a certain type of pressure transducer need to be manufactured and the versions differ in terms of the type of construction of the interface module, a plurality of different connection assemblies are produced and maintained. FIG. 3 illustrates, in addition to connection assembly 18, different connection assemblies 64 and 66. The annular flanges 44 of the different connection assemblies 18, 64, and 66 are identical. Both connection assembly 64 and connection assembly 18 have an apparatus plug.

Connection assembly 66 has a cable design. Illustrated connection assemblies 18, 64, and 66 are merely examples. There can be more than three different connection assemblies. During manufacture of the pressure transducer as described in the foregoing using FIG. 3, one of the various connection assemblies 18, 64, or 66 is selected and the selected connection assembly is connected to the transducer unit 62 as has already been described in the foregoing for connection group 18. As can be seen from the preceding description and FIG. 3, for any particular type of pressure transducer, the housing 22 is identical regardless of the construction type for the selected connection assembly 18, 64. or 66. This makes it possible to produce the transducer unit 62, i.e., in particular to weld the housing 22 to the pressure connection 2 before it has been determined which connection assembly 18, 64, or 66 will be used. The ability to connect one and the same housing 22 to each connection assembly 18, 64, and 66 is made possible by the design of their adapter ring 42, that is, by the fact that at least the annular flange 44 of the various connection assemblies 18, 64, and 66 is the same.

In order to be able to provide short delivery times despite the ability to select among a plurality of connection assemblies, based on the inventive design of the pressure transducer and the inventive method, it is sufficient merely to maintain in storage the various connection assemblies 18, 64, and 88, on the one hand, and the tested and adjusted transducer unit 62, which can be connected to each of the connection assemblies 18, 64, and 66. Once a customer order has been received, therefore, the connection assembly the customer desires can be connected to the transducer unit 62 in the rapid and simple manner described to produce a finished and adjusted pressure transducer. This means that a favorable combination of short delivery time and relatively low storage maintenance is achieved. In addition, final assembly does not require any tools other than a soldering tool so that if necessary it can even be performed away from the manufacturing location, e.g., in a supply depot.

Figure 4:
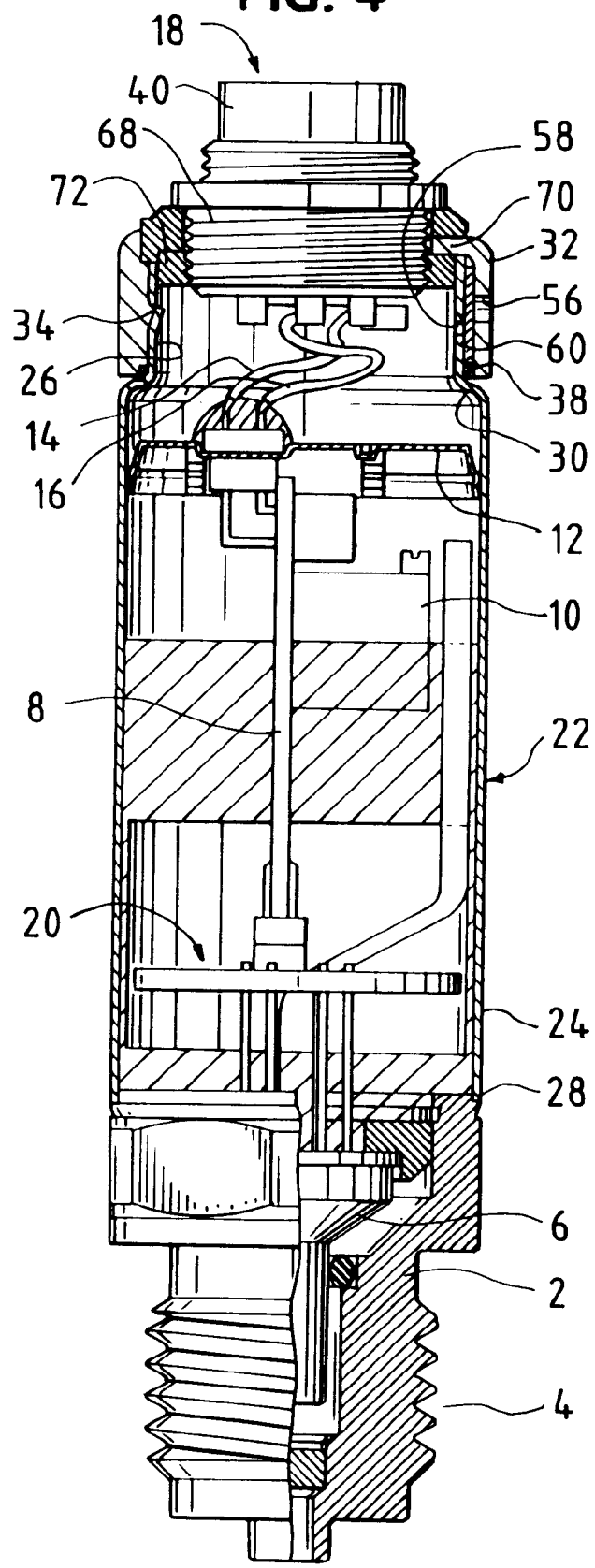
FIG. 4 shows a longitudinal section through a second embodiment of the pressure transducer in accordance with the invention; and, FIG. 5 shows elements of the pressure transducer in accordance with FIG. 4 and the elements can be connected to each other during manufacture of said transducer.

Those elements of the embodiment of the pressure transducer illustrated in FIG. 4 that are identical to the elements in the first embodiment in accordance with FIGS. 1 and 2 are numbered the same in FIG. 4 as in FIGS. 1 and 2. These elements will not be re-explained in the context of FIG. 4. The explanations given for FIGS. 1 and 2 also apply for the embodiment in FIG. 4.

As can be seen in FIG. 4, the construction of the appliance plug 40 of the interface module 18 differs from the construction of the appliance plug 40 illustrated in FIG. 1.

The pressure transducer in accordance with FIG. 4 differs from the pressure transducer in accordance with FIGS. 1 and 2 in that in the second embodiment the locking ring 32 and the interface module 18 are integrated, i.e., they are combined in a single sub-system. The appliance plug 40 of the interface module 18 comprises a base 68 that is provided an external thread. Formed on the locking ring 32, which is made of plastic, is an internal annular flange 70 that is secured to the appliance plug 40 by means of a nut 72 screwed onto the external thread of the base 68. Alternatively, the locking ring 32 can also be screwed directly onto the base 68 or can be glued to it.

The locking ring 32 of the second embodiment form does not have an external thread. The union nut 46 used for the first embodiment is not used for the second embodiment. The second embodiment represents even greater simplification in terms of construction and manufacture because the union nut is not used.

The ventilation apparatus in the exemplary embodiment is again formed by the opening 56, membrane 60, and opening 58, but does not comprise additional threading as is used in the embodiment in accordance with FIG. 1.

Figure 5:
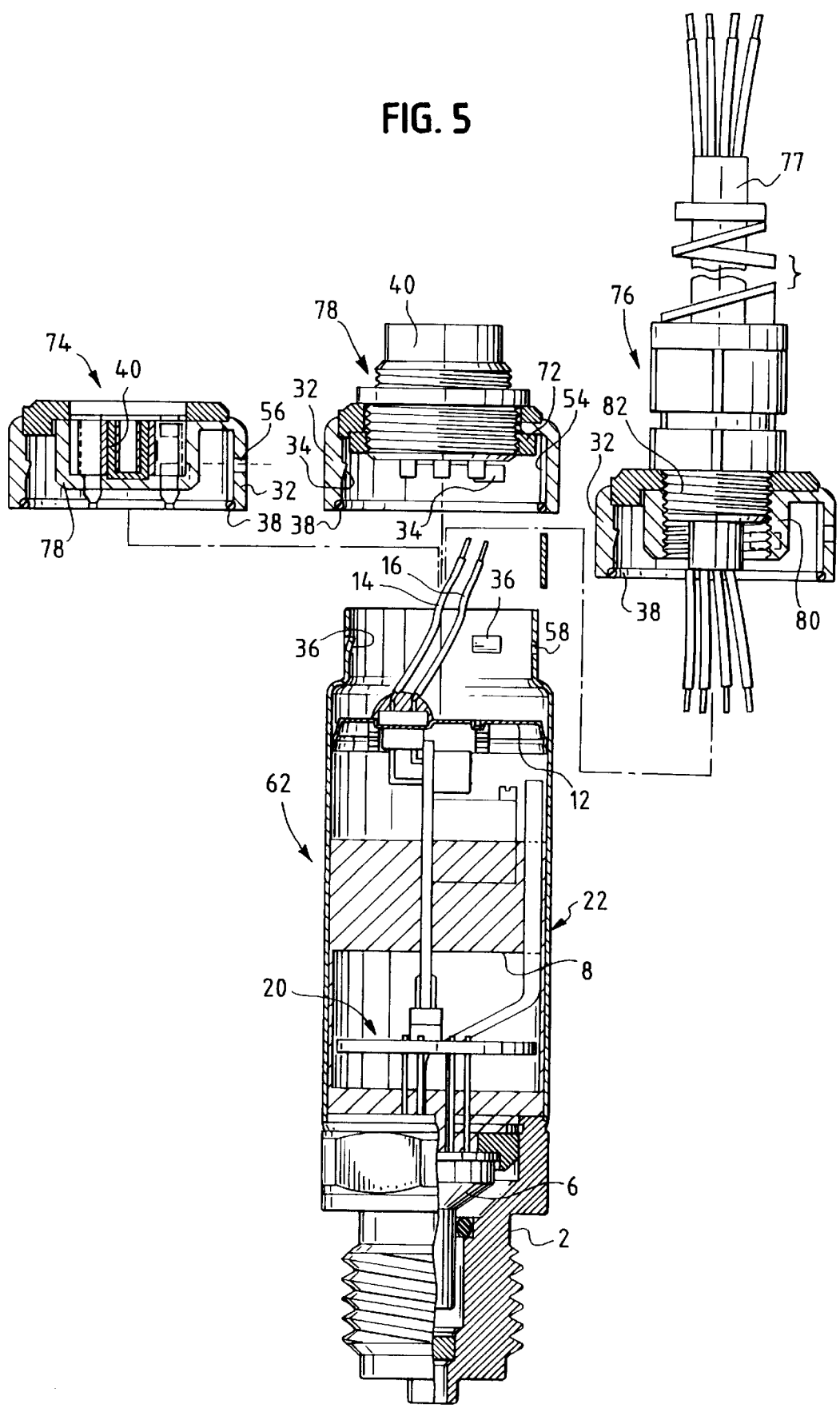

Manufacture of the pressure transducer in accordance with the second embodiment is explained in the following using FIG. 5. The transducer unit 62 is produced in the same manner as was described in the foregoing in connection with FIG. 3. After the transducer unit 62 has been produced, tested, and adjusted, the sub-system (comprising interface module 18 and locking ring 32) is connected to the transducer unit 62 in that first the lines 14 and 16 are placed in contact with the appliance plug 40 before the locking ring 32, with the intermediate sealing ring 38 and membrane 60, is placed onto the cylindrical end section 24 and locked onto it. This concludes manufacture of the pressure transducer, including functional testing and adjusting.

As does the first embodiment, the second embodiment offers the ability to select among different interface modules. Instead of the interface module 18, alternatively one of the two interface modules 74 and 76 also illustrated in FIG. 5 can be connected to the transducer unit 62. Interface module 74 comprises an appliance plug 40 to which a plug housing 78 also belongs; it is designed as a single piece with the locking ring 2. Interface module 76 is designed as a cable for a signal cable 77. For the interface module 76, the locking ring 32 is designed as a single piece with a threaded ring 80 that is screwed onto a bushing 82 for the cable. Again, interface modules 18, 74, and 76 as illustrated are merely examples. There can be more than three different sub-systems comprising the locking ring 32 and an interface module.

For the second embodiment, as well, the housing 22 is identical for a particular type of pressure transducer, regardless of the type of interface module 18, 74, or 76 selected. The ability to connect the housing 22 to each of the interface modules 18, 74, and 76 is provided by the fact that the locking rings 32 for the different interface modules are identical in that region that engages with the cylindrical end section 26.

In the second embodiment illustrated, the locking ring 32 encloses the cylindrical end section 26. Alternatively, the locking ring can also be designed and arranged such that it is inserted into the cylindrical end section 26 and is enclosed by the cylindrical end section 26, it then being useful for the shoulder 30 in this case to project radially inward. In this design the projections and seats that constitute the locking apparatus are on the external side of the locking ring or on the internal side of the cylindrical end section 26.

The invention is not limited to the embodiments described in the foregoing. On the contrary, numerous other embodiments are possible within the framework invention as explained in the foregoing introduction and as defined in the claims.

The pressure transducer comprises a pressure connection and a tube-shaped housing that is securely attached at its lower end section to the pressure connection. Arranged in the interior of the housing are a pressure sensor carried by the pressure connection and a circuit arrangement. An interface module is attached at the upper end section of the housing, the connection between the interface module and the upper end section being effected by means of a locking ring that is locked to the housing and that is either integral with the interface module or that carries a union nut that secures the interface module to the locking ring. During manufacture of the pressure transformer, the housing is attached to the pressure connection before the interface module is brought into electrical contact with the circuit arrangement and before it is connected mechanically to the housing. This makes it possible to adjust the pressure transducer prior to attaching the interface module. Furthermore, the pressure transducer can be provided with a plurality of different interface modules without this resulting in disadvantages during manufacture of the pressure transducer. (FIG. 1)

We claim:

1. Pressure transducer comprising a pressure connection (2) for connecting the pressure transducer to a system containing a measured medium; a tube-shaped housing (22) having a first and a second end section (24, 26) that is securely connected at its first end section (24) to said pressure connection (2); a pressure sensor (6) that is attached at said pressure connection (2); a circuit arrangement (8) arranged in said housing (22) for supplying said pressure sensor (6) with electrical auxiliary energy and for processing an electrical output signal from said pressure sensor; and having an interface module (18, 64, 66, 74, 76) that is electrically connected to said circuit arrangement (8) and through which said electrical output signal from the pressure transducer is provided and electrical auxiliary energy is supplied to the pressure transducer, the interface module (18, 64, 66, 74, 76) being securely connected to the second end section (26) of the housing (22), which faces away from said pressure connection (2),characterized in that the connection between said interface module (18, 64, 66, 74, 76) and said second end section (26) comprises a locking apparatus (34, 36).

2. Pressure transducer in accordance with claim 1, characterized in that said second end section (26) of said housing (22) is cylindrical in shape, in that a locking ring (32) engages said cylindrical end section (26), in that said locking apparatus (34, 36) comprises at least one projection (34), which is formed either on said locking ring (32) or on said cylindrical end section (26), and at least one seat (36), which is formed on the other of these said parts (cylindrical end section (26) or locking ring g(32)) and into which said projection (34) locks, and in that said interface module (18, 64, 66, 74, 76) is connected to said locking ring (32).

3. Pressure transducer in accordance with claim 2, characterized in that there are three each of said projections (34) and of said associated seats (36) and in that said projections and seats are distributed evenly around the circumference of said cylindrical end section (26).

4. Pressure transducer in accordance with claim 2 or 3, characterized in that said locking apparatus is a bayonet coupling apparatus.

5. Pressure transducer in accordance with any of claims 1 through 3, characterized in that said locking ring (32) is arranged on the external side of said cylindrical end section (26), in that said locking ring (32) is provided an external thread (48) on its external side, in that said interface module (18, 64, 66) comprises an annular flange (44), and in that screwed onto the external thread (48) of said locking ring (32) is a union nut (46) that secures said annular flange (44) to said locking ring (32).

6. Pressure transducer in accordance with claim 5, characterized in that said interface module (18, 64, 66) comprises an adapter ring (42) on which said annular flange (44) is formed.

7. Pressure transducer in accordance with any of claims 2 through 4, characterized in that said locking ring (32) and said interface module (18, 74, 76) are combined to form a sub-system.

8. Pressure transducer in accordance with claim 7, characterized in that said interface module (18) comprises a base (68) and in that said locking ring (32) is screwed or glued onto said base (68).

9. Pressure transducer in accordance with claim 7, characterized in that said locking ring (32) is designed as a single piece with one component (78, 80) of said interface module (74, 76).

10. Pressure transducer in accordance with claim 9, characterized in that said interface module (74) comprises a plug housing (78) with which said locking ring (32) is formed as one piece.

11. Pressure transducer in accordance with any of claims 2 through 10, characterized in that said locking ring (32) comprises a plastic.

12. Pressure transducer in accordance with claim 2, characterized in that said cylindrical end section (26) of said housing comprises a shoulder (30) upon which sits a sealing ring (38) between said locking ring (32) and said housing (22).

13. Pressure transducer in accordance with claim 2, characterized in that said locking ring (32) comprises on its side that faces away from said cylindrical end section (26) and/or said cylindrical end section (26) comprises on its side that faces said locking ring (32) a recess (54), in that in the region of said recess (54) both said cylindrical end section (26) and said locking ring (32) are provided with an opening (56, 58), and in that arranged in said recess (54) is a membrane (60) made of a liquid-impermeable and gas-permeable material.

* * * * *